(12) United States Patent
Ehlen et al.

(10) Patent No.: US 10,445,060 B2
(45) Date of Patent: *Oct. 15, 2019

(54) SYSTEM AND METHOD FOR CONTROLLING PRESENTATIONS USING A MULTIMODAL INTERFACE

(71) Applicant: AT&T Intellectual Property II, L.P., Atlanta, GA (US)

(72) Inventors: Patrick Ehlen, Brooklyn, NY (US); David Crawford Gibbon, Lincroft, NJ (US); Mazin Gilbert, Warren, NJ (US); Michael Johnston, New York, NY (US); Zhu Liu, Malboro, NJ (US); Behzad Shahraray, Holmdel, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 726 days.

This patent is subject to a terminal disclaimer.

(21) Appl. No.: 14/641,762

(22) Filed: Mar. 9, 2015

(65) Prior Publication Data

US 2015/0178044 A1 Jun. 25, 2015

Related U.S. Application Data

(63) Continuation of application No. 11/207,439, filed on Aug. 19, 2005, now Pat. No. 8,977,965.

(51) Int. Cl.
*G06F 3/16* (2006.01)
*G06F 3/0482* (2013.01)
*G06F 3/0484* (2013.01)
*G06F 3/038* (2013.01)
*G06F 3/0483* (2013.01)

(52) U.S. Cl.
CPC .............. *G06F 3/167* (2013.01); *G06F 3/038* (2013.01); *G06F 3/0482* (2013.01); *G06F 3/0483* (2013.01); *G06F 3/04842* (2013.01); *G06F 2203/0381* (2013.01)

(58) Field of Classification Search
CPC .. G06F 3/0482; G06F 3/04842; G06F 3/0483; G06F 3/038; G06F 3/167; G06F 2203/0381
See application file for complete search history.

(56) References Cited

U.S. PATENT DOCUMENTS

5,442,744 A 8/1995 Piech et al.
5,740,425 A 4/1998 Povilus
(Continued)

*Primary Examiner* — Dino Kujundzic (57) ABSTRACT

The invention provides for a system, method, and computer readable medium storing instructions related to controlling a presentation in a multimodal system. The method embodiment of the invention is a method for the retrieval of information on the basis of its content for real-time incorporation into an electronic presentation. The method comprises receiving from a presenter a content-based request for at least one segment of a first plurality of segments within a media presentation and while displaying the media presentation to an audience, displaying to the presenter a second plurality of segments in response to the content-based request. The computing device practicing the method receives a selection from the presenter of a segment from the second plurality of segments and displays to the audience the selected segment.

17 Claims, 9 Drawing Sheets

(56) References Cited

U.S. PATENT DOCUMENTS

| | | |
|---|---|---|
| 6,144,991 A | 11/2000 | England |
| 6,157,364 A * | 12/2000 | Kohler ................ G06T 11/206 |
| | | 715/855 |
| 6,351,765 B1 | 2/2002 | Pietropaolo et al. |
| 6,397,181 B1 | 5/2002 | Li et al. |
| 6,490,550 B1 | 12/2002 | Hiri |
| 6,526,351 B2 | 2/2003 | Whitham |
| 6,665,835 B1 | 12/2003 | Gutfreund et al. |
| 6,789,105 B2 | 9/2004 | Ludwig et al. |
| 6,868,383 B1 | 3/2005 | Bangalore et al. |
| 6,968,506 B2 | 11/2005 | Yacovone et al. |
| 7,124,366 B2 | 10/2006 | Foreman et al. |
| 7,131,059 B2 | 10/2006 | Obrador |
| 7,725,307 B2 | 5/2010 | Bennett |
| 7,725,320 B2 | 5/2010 | Bennett |
| 7,873,652 B1 | 1/2011 | Hill |
| 2002/0036694 A1 | 3/2002 | Merril |
| 2002/0140724 A1 * | 10/2002 | Qureshi ................ G06F 3/0481 |
| | | 715/730 |
| 2002/0150869 A1 | 10/2002 | Shpiro |
| 2003/0023435 A1 | 1/2003 | Josephson |
| 2003/0023440 A1 | 1/2003 | Chu |
| 2003/0208473 A1 | 11/2003 | Lennon |
| 2004/0083092 A1 | 4/2004 | Valles |
| 2004/0103150 A1 | 5/2004 | Ogdon et al. |
| 2004/0103372 A1 | 5/2004 | Graham |
| 2004/0220926 A1 | 11/2004 | Lamkin et al. |
| 2005/0038660 A1 | 2/2005 | Black et al. |
| 2005/0050042 A1 | 3/2005 | Elder |
| 2005/0114825 A1 | 5/2005 | Leung et al. |
| 2005/0144258 A1 | 6/2005 | Burckart et al. |
| 2005/0154595 A1 * | 7/2005 | Bodin ............... H04L 29/06027 |
| | | 704/277 |
| 2005/0216443 A1 | 9/2005 | Morton et al. |
| 2005/0273693 A1 | 12/2005 | Peterson |
| 2006/0008256 A1 | 1/2006 | Khedouri et al. |
| 2006/0047637 A1 | 3/2006 | Meyerzon et al. |
| 2006/0048058 A1 * | 3/2006 | O'Neal ................ G06F 17/241 |
| | | 715/730 |
| 2006/0123045 A1 | 6/2006 | Chang et al. |
| 2006/0294468 A1 | 12/2006 | Sareen et al. |
| 2006/0294469 A1 | 12/2006 | Sareen et al. |
| 2008/0082568 A1 | 4/2008 | Miller et al. |
| 2008/0177866 A1 | 7/2008 | Bodin et al. |
| 2008/0201375 A1 | 8/2008 | Khedouri et al. |
| 2008/0306988 A1 | 12/2008 | Aggarwal et al. |
| 2009/0254828 A1 | 10/2009 | Denoue et al. |

* cited by examiner

SYSTEM AND METHOD FOR CONTROLLING PRESENTATIONS USING A MULTIMODAL INTERFACE

PRIORITY INFORMATION

The present application is a continuation of U.S. patent application Ser. No. 11/207,439, filed Aug. 19, 2005, the contents of which is incorporated herein by reference in its entirety.

BACKGROUND OF THE INVENTION

1. Field of the Invention

The present invention relates to a system and method allowing more natural, flexible, and accurate control of a presentation by a presenter.

2. Introduction

In the workplace and classroom, a common task is the presentation of a sequence of media segments such as slides to an audience as part of a formal presentation. Microsoft's PowerPoint® software provides an example of an application that enables users to present visual images stepping from one slide to another. Such applications provide users with an opportunity to teach, sell, give briefings and so forth with more substance and power than merely by speaking.

Tools such as Microsoft's PowerPoint are adequate for the presentation of a single, well-ordered, linear sequence of slides. However, it is frequently the case that users will want to access slides in a non-linear fashion in the course of a live presentation. For example, they may need to jump to an earlier slide in order to answer a question or quickly identify and present a slide from a source not included in the original presentation. These tasks are extremely cumbersome using the currently available direct manipulation and menu-based interface which results in an interruption in the presentation and loss of time.

In some systems, users can direct the basic navigation of slides in a presentation using an input device such as a remote controller, computer keyboard, or mouse, or physical objects incorporating mnemonics such as it taught in U.S. Pat. No. 6,732,915. Voice-recognition systems may be used in order to direct the basic navigational commands of the slideshow, for example, "next slide please," "please show the previous slide," "please show slide five." While the ability to direct the basic navigational commands of the slideshow using a voice recognition system offers an advantage over other methods in that it is more natural, previous voice recognition systems fail to provide control of the presentation beyond basic navigational commands within a linear series of media segments. Another problem occurs when voice recognition systems attempt to distinguish between the spoken portion of an oral presentation and verbal commands given by the orator to move to a different slide in the presentation. Displaying material that does not properly relate to the spoken portion of a presentation is embarrassing to the presenter, and distracting to the audience.

Further sources of disruption in a presentation setting are introduced if the presenter desires to access media segments not included in the originally prepared sequence. Current methods and systems allow the presenter to access such media only after closing the prepared presentation, finding the desired slide show, loading that slide show, and finding the desired slide within that slideshow which is an altogether awkward and time-consuming process.

What is needed in the art is an improved method and system for controlling the content available to a presenter without interrupting the presentation as viewed by the audience.

SUMMARY OF THE INVENTION

Additional features and advantages of the invention will be set forth in the description which follows, and in part will be obvious from description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art. The controls available in a typical presentation system do not allow the presenter to easily and rapidly find the content required to support a presentation without significantly interrupting the flow of the presentation. User-directed content-based control is the element that will allow a presenter to most effectively navigate the material in a presentation for his or her audience. The present invention enhances the control of a presenter over his or her presentation by introducing the capacity to find and incorporate material into a presentation on the basis of its content, above and beyond the original location of that material in the context of a particular presentation.

The invention provides for a system, method, and computer readable medium storing instructions related to controlling a presentation in a multimodal system. The method embodiment of the invention is a method for the retrieval of information on the basis of its content for real-time incorporation into an electronic presentation. The method comprises receiving from a presenter a content-based request for at least one segment of a first plurality of segments within a media presentation and while displaying the media presentation to an audience, displaying to the presenter a second plurality of segments in response to the content-based request. The computing device practicing the method receives a selection from the presenter of a segment from the second plurality of segments and displays to the audience the selected segment.

BRIEF DESCRIPTION OF THE DRAWINGS

In order to describe the manner in which the above-recited and other advantages of and features of the invention can be obtained, a more particular description of the invention briefly described above will be rendered in reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention enables a presenter to more efficiently present and navigate a media presentation via software such as Microsoft's Powerpoint®. The invention contemplates a multimodal interface where the presenter can interact with a computing device in multiple ways, such as a graphic touch sensitive display, a motion sensor interactive system, and a voice interaction and natural language dialog.

According to an aspect of the invention, the multimodal presentation control system includes two displays. Only one of these two displays is visible to the audience, displaying only the current slide specified by the presenter. This view will often be displayed for the audience using a projector or any type of display system. The displays are controlled by a computing device. The computing device shows a presenter GUI on the second display visible only to the presenter. This display may be associated with a tablet computer, laptop computer, personal digital assistant, desktop computer or any such computing device. Thus, the nature of the system necessitates the use of a computer system capable of simultaneously running and controlling at least two unique displays.

Figure 1:
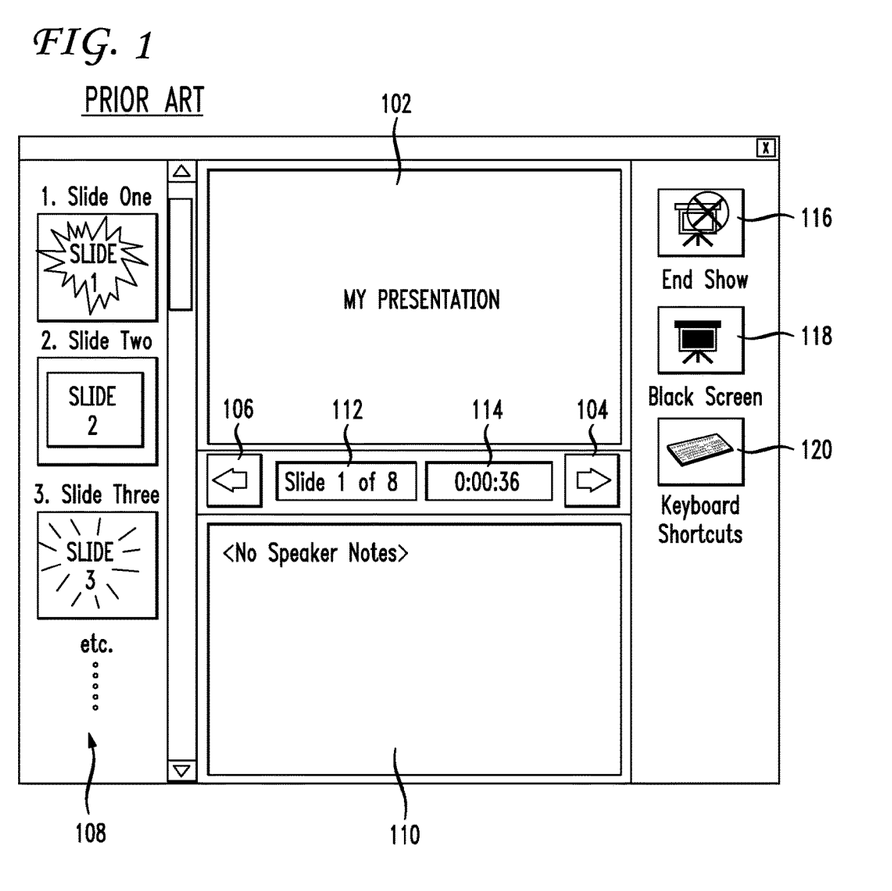
FIG. 1 illustrates a graphical user interface typical of a presentation control system.

First a known presenter system is discussed. FIG. 1 is an illustration of prior art used in presenting a sequence of prepared slides graphical user interface (GUI) 100. GUI 100 may include a current slide field 102, next slide button 104, previous slide button 106, scrolling slide tray 108, speaker notes area 110, slide counter bar 112, slideshow timer bar 114, end show button 116, black screen button 118, and keyboard shortcuts button 120.

Current slide field 102 may continuously display to the presenter what is being shown to the audience at any given time during the presentation. Clicking on, or otherwise initiating, next slide button 104 proceeds to the next slide in the pre-arranged series. Clicking on, or otherwise initiating, previous slide button 106 proceeds to the slide shown just prior to the current slide in the pre-arranged series. The scrolling slide tray 108 may display thumbnail images of all of the slides in the presentation arranged in their pre-arranged order. Speaker notes area 110 may display text accompanying a given slide for use by the presenter in his or her spoken presentation. These notes are only shown to the presenter. The function of slide counter bar 112 is simply to show the number of the slide currently on display out of a numerical series of slides. Slideshow timer bar 114 continuously displays the elapsed time from the beginning of the presentation. An end show button 116 may be used to terminate the presentation when clicked, or otherwise initiated. When clicked, or otherwise initiated, black screen button 118 interrupts the slide presentation by displaying to the audience a black screen, without terminating the presentation. A keyboard shortcuts button 120, when clicked, or otherwise initiated, may allow the user to view and specify the manner in which computer keystrokes may be used to control basic navigation between slides in the presentation, such as the functions of next slide button 104 and previous slide button 106.

The modules of GUI 100 may continuously display to the presenter what is seen by the audience at any given time during the presentation, proceed to the next slide in a pre-arranged series, proceed to the slide shown just prior to the current slide in a pre-arranged series, display thumbnail images of all of the slides in the presentation arranged in their pre-arranged order, show the number of the slide currently on display out of a numerical series of slides, continuously display the elapsed time from the beginning of the presentation, terminate the presentation, interrupt the slide presentation by displaying to the audience a black screen, and allow the user to view and specify the manner in which computer keystrokes can be used to control the basic navigation between slides in a presentation.

In applications such as Powerpoint, if a user is into a slide presentation and desires to skip to a slide that is not the following slide or previous slide to the present slide, the user may need to "right click" on the mouse and pull up a menu that has an option to view a "slide navigator". In the slide navigator window, the user can choose from a listing of slides. If there are too many slides in the slideshow, the user may need to scroll down to find the slide that is desired. This navigation process is on the display seen by the audience and can be disruptive to the presentation.

Figure 2:
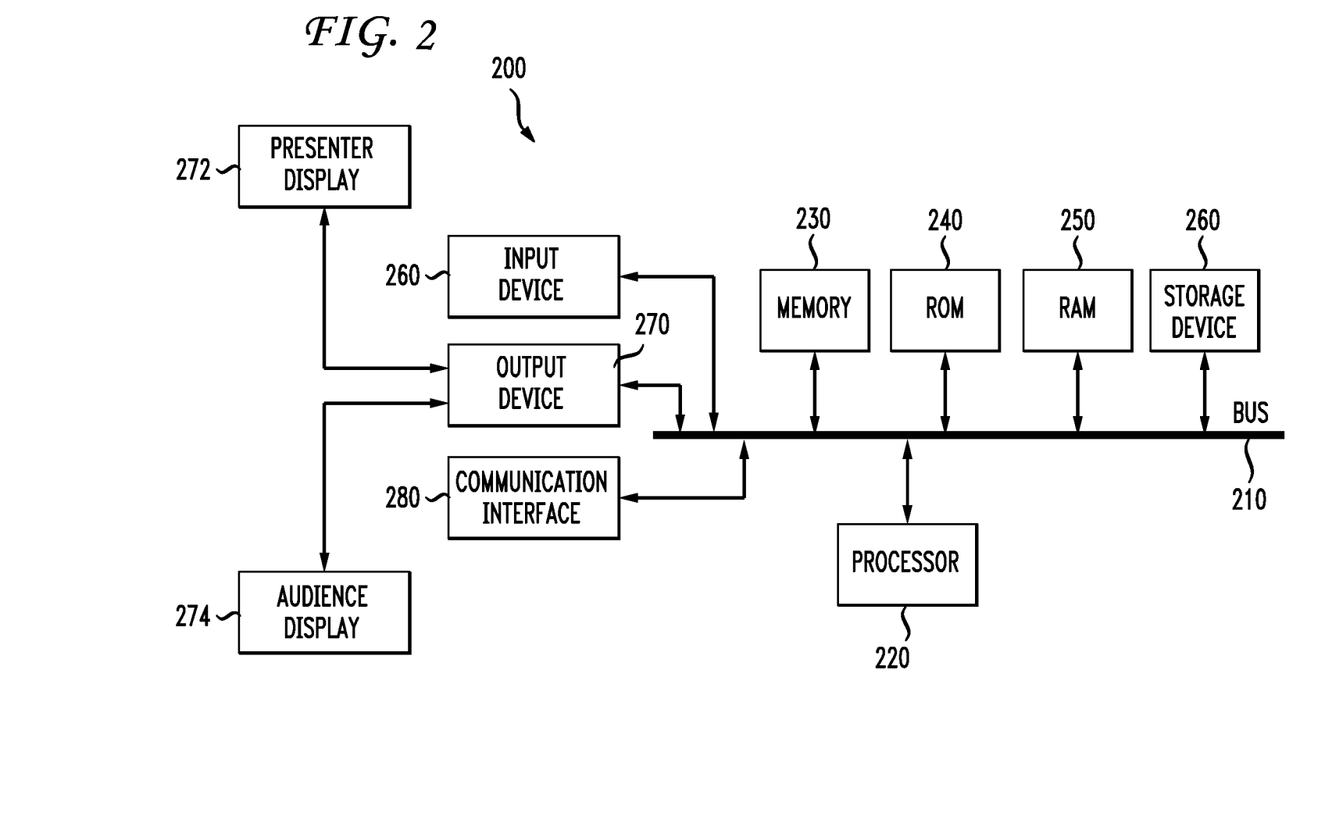
FIG. 2 illustrates a general computing device.

The present invention improves upon prior systems by enhancing the presenter display and enabling a multimodal search and retrieve mechanism to more efficiently navigate the current slide show as well as access other information during a presentation. With reference to FIG. 2, an exemplary system for implementing the invention includes a general-purpose computing device 200, including a processing unit (CPU) 220, a system memory 230, and a system bus 210 that couples various system components including the system memory 230 to the processing unit 220. It can be appreciated that the invention may operate on a computing device with more than one CPU 220 or on a group or cluster of computing devices networked together to provide greater processing capability. The system bus 210 may be any of several types of bus structures including a memory bus or memory controller, a peripheral bus, and a local bus using any of a variety of bus architectures. The system may also include other memory such as read only memory (ROM) 240 and random access memory (RAM) 250. A basic input/output (BIOS), containing the basic routine that helps to transfer information between elements within the computing device 200, such as during start-up, is typically stored in ROM 240. The computing device 200 further includes storage means such as a hard disk drive 260, a magnetic disk drive, an optical disk drive, tape drive or the like. The storage device 260 is connected to the system bus 210 by a drive interface. The drives and the associated computer readable media provide nonvolatile storage of computer readable instructions, data structures, program modules and other data for the computing device 200. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 200, an input device 260 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 270 can also be one or more of a number of output means. For use in the case of the invention as described herein, for example at least two distinct video outputs for use in graphical displays are intended. Thus, there are sub-sets of the output device 270: presenter display adapter 272 and audience display adapter 274. The specification of these components herein is not intended preclude the use of additional outputs to be classified under output device 270. In some instances, multimodal systems enable a user to provide multiple types of input to communicate with the computing device 200. The communications interface 280 generally governs and manages the user input and system output.

Figure 3:
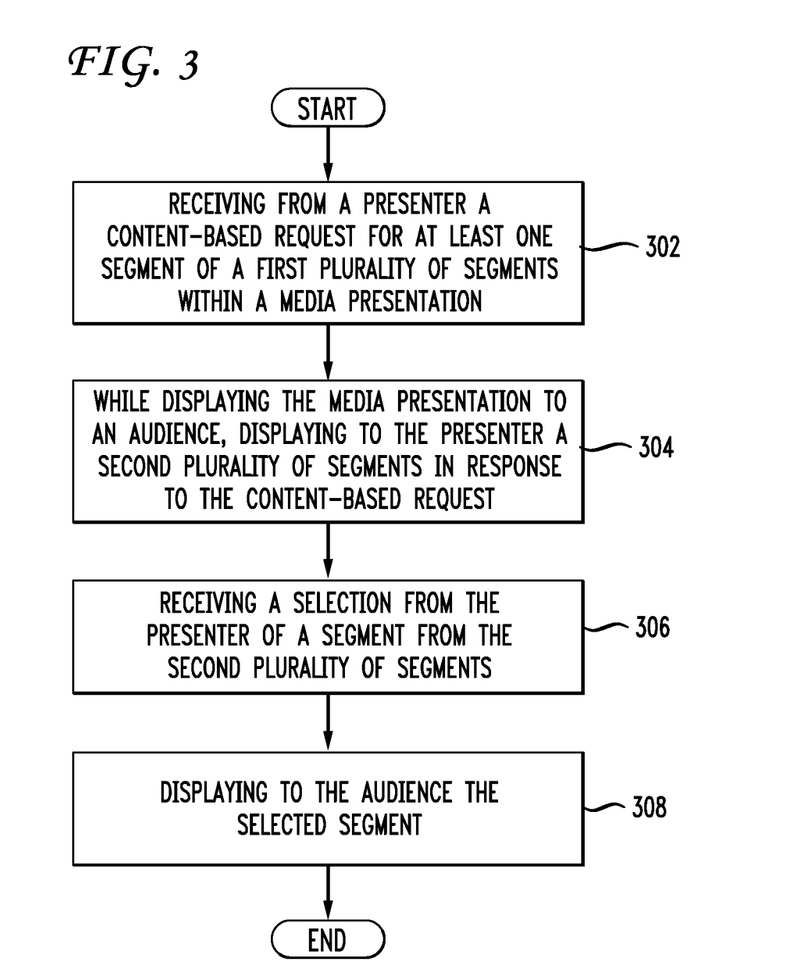
FIG. 3 illustrates a method embodiment of the invention.

The illustration FIG. 3 shows the methodical flowchart illustrating the method embodiment of the invention that is operated by an exemplary computing device. The method preferably is practiced in the context of a user giving a presentation. The method portrayed herein begins with the exemplary computing device receiving from a presenter a content-based request for at least one segment of a first plurality of segments within a media presentation 302. As an example, the presenter may be presenting a Powerpoint slide show about American history and desire to return to a particular slide. The presenter can state "please return to the slide about Lexington and Concord". The request may be based on the content of the particular slide the presenter desires to go to. The computing device, while displaying the media presentation to the audience, shows on the presenter display a second group of zero or more segments in response to the content-based request 304. There may be several slides having similar or related content, such as about Lexington and Concord. Therefore, a plurality of slides or segments may be retrieved as a result of the query. Given that the computing device shows zero or more slides in response to the inquiry, the presenter can easily narrow the selection from the second group of segments by another multimodal input such as touching the touch sensitive screen or by speaking and saying "slide number 2". This provides an improvement over the slide navigation approach previously used which is seen by the audience. Suppose three slides matched the inquiry and that in the overall slide presentation, these slides were numbered 10, 12 and 25. The second group of segments may be assigned new numbers such as slide number 1, 2, 3 etc. such that the presenter can easily choose the right slide 306. For example, the user may say "slide three" instead of being required to say "slide twenty-five" to have that slide presented to the audience. Once the computing device receives the presenter selection, the computing device displays the selected segment on the audience display 308.

The second group of segments may also be retrieved from other media presentations, the Internet, preprocessed decks or dynamically processed decks. The computing device operated by the presenter may have an Internet connection that allows the presenter access to other decks or other data or segments available via a content based search. The computing device may communicate via a local network, secured network, wireless network such as a Bluetooth or any type of wireless protocol, or any other communication means to other data that may be preprocessed as a searchable deck. For example, if the presenter is a college professor and has on his office computer a slide presentation from a previous lecture that has information pertinent to a student question, and assuming that the office computer is networked to the computing device running the presentation, the presenter can say "please pull the slide regarding the battle of bunker hill from my office computer, September presentation". Other language of course may be used but the computing device can identify from this the computer to check, and which preprocessed presentation (the September one) to search for the appropriate slide. Similarly, the presenter may have a portable computing device having a preprocessed slide that the presenter was working on while traveling. The presenter could say "please present from my handheld computer the slide about the battle of bunker hill."

The above functionality is enabled by a connectivity and synchronization between the presenting computing device and the other computing device that holds the updated document(s). The connectivity may be accomplished via a wired connection, Bluetooth, WiFi, a cradle connect, Ethernet, USB, serial port and so forth. The synchronization may involve automatically identifying updated content, and indexing the content to the server or presentation computing device such that the updated content is incorporated into the grammar and made searchable via the system.

The computing device storing the updated content may declare when it is connected to the presenting computing device that it wants a deck to be made available for processing and indexing. The computing device may then transmit a copy of the relevant information such as the corpus and other information over the connection to the presenting computing device.

Figure 4A:
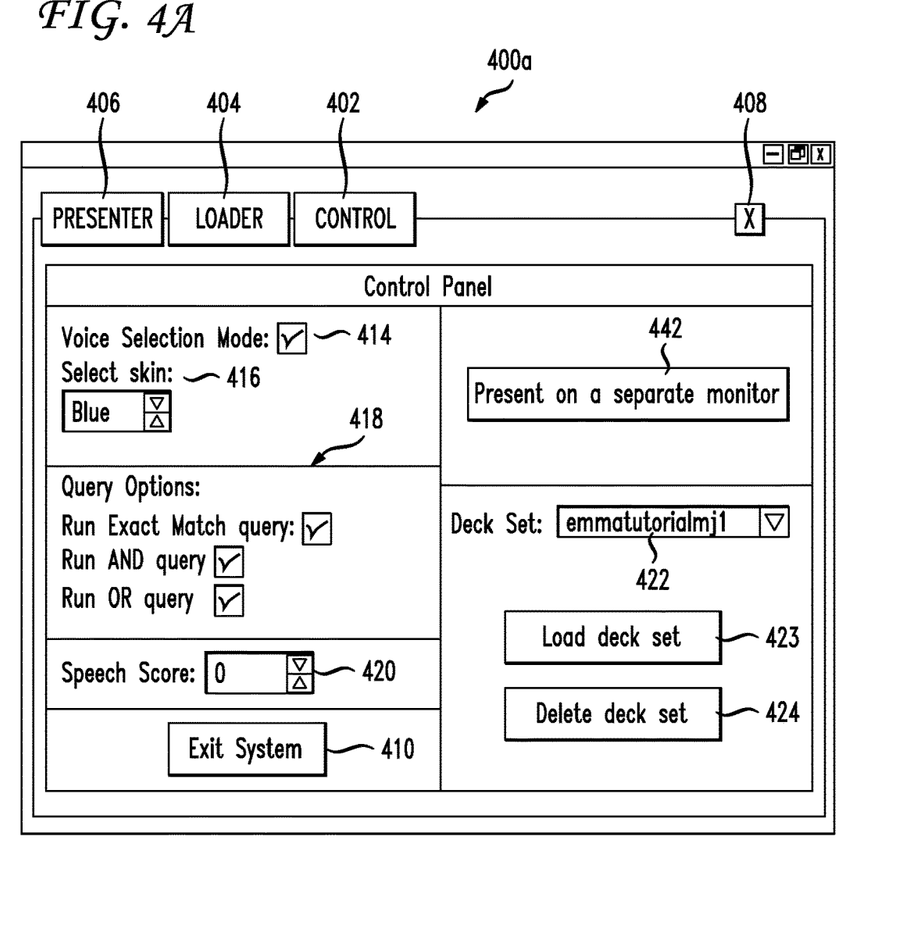
FIG. 4A illustrates a control panel in the Graphical User Interface.
Figure 4B:
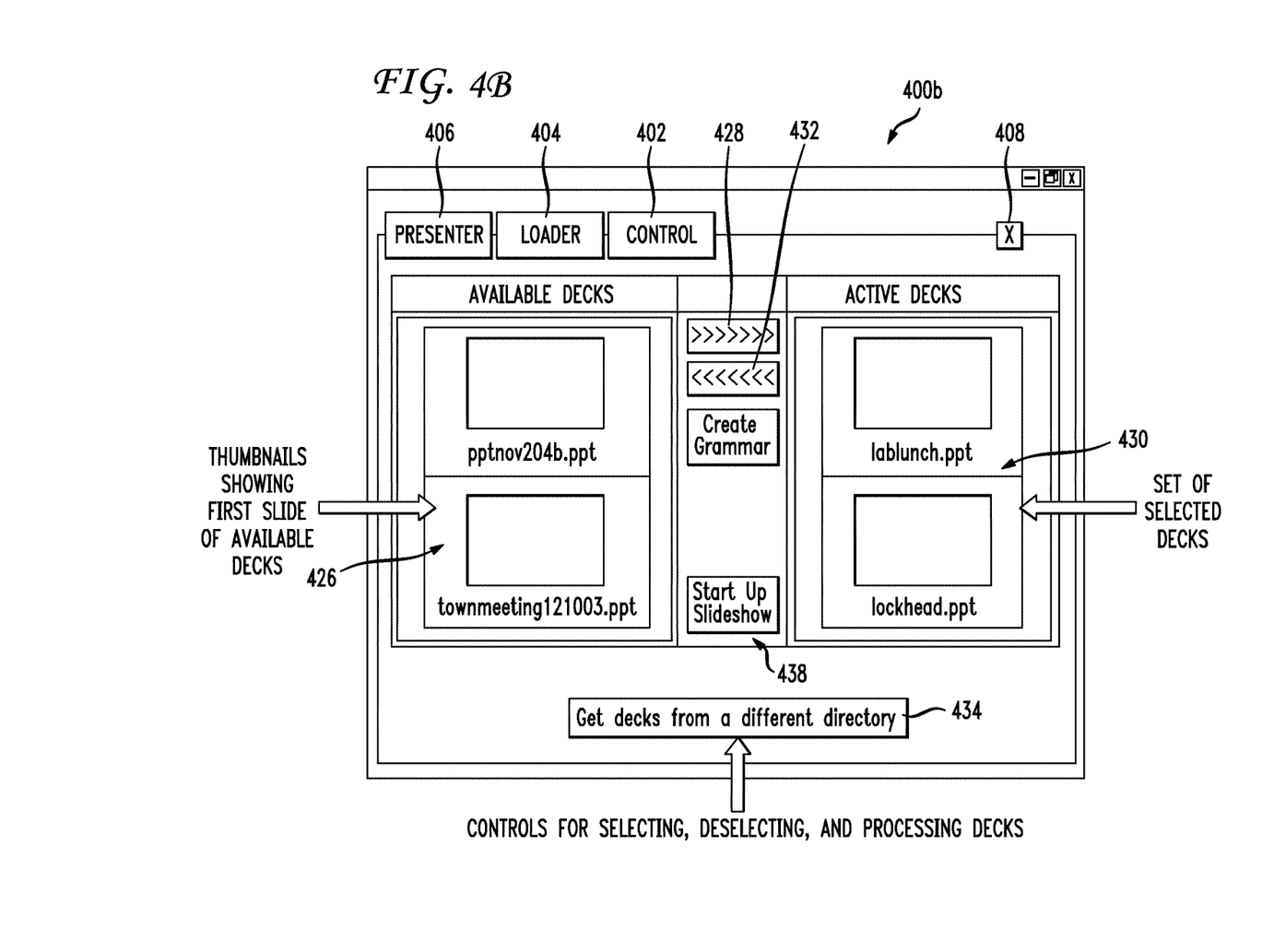
FIG. 4B illustrates a loader panel in the GUI.
Figure 4C:
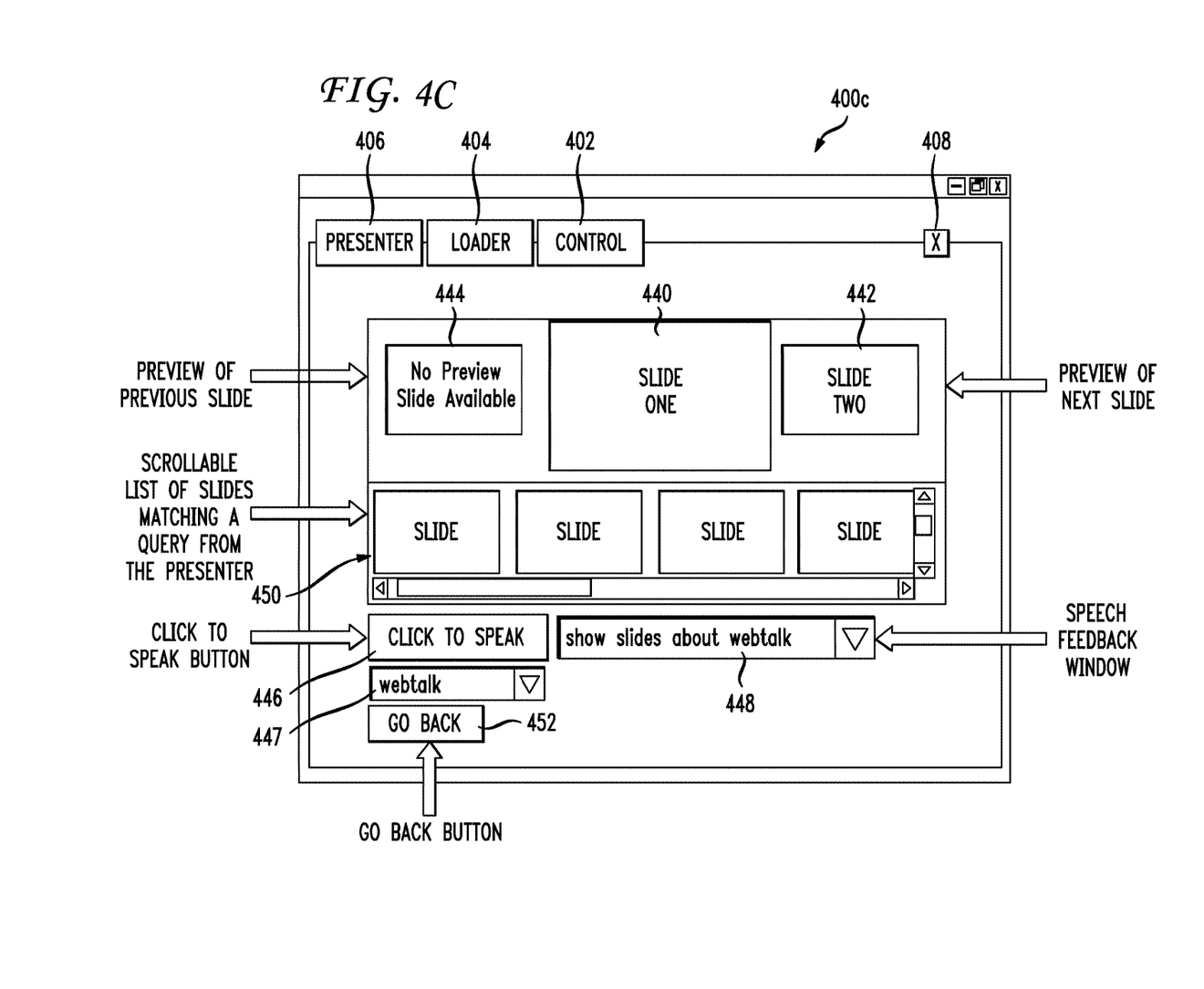
FIG. 4C illustrates a presenter panel in the GUI.

The illustrations entitled FIG. 4A, FIG. 4B, and FIG. 4C represent several views of an exemplary graphical user interface (GUI). GUI module may include a control view 400A, loader view 400B, and presenter view 400C. Features shared in the child views for which GUI is the parent view may include the control tab 402, loader tab 404, presenter tab 406, and exit tab 408.

Control tab 402 may be used to change views to control view 400A and to indicate when the present view is control view. Loader tab 404 may be used to change views to loader view 400B and to indicate when the present view is loader view. Presenter tab 406 may be used to change views to presenter view 400C and to indicate when the present view is presenter view.

Upon initiating the module GUI, the first screen presented to the user is control view 400A as illustrated in FIG. 4A. This view may contain fundamental controls on which controls in the loader view 400B and presenter view 400C are based as well as additional controls. Controls in the control view 400A may include an "EXIT SYSTEM" button 410, "PRESENT ON A SEPARATE MONITOR" button 442, "VOICE SELECTION MODE" checkbox 414, "SELECT SKIN" drop-down list 416, "QUERY OPTIONS" checkbox field 418, "SPEECH SCORE" value field 420, "DECK SET" drop-down list 422, "LOAD DECK SET" button 423, and "DELETE DECK SET" button 424.

Button 410, when clicked, or otherwise initiated by an input, exits GUI 400. Button 412, when clicked, or otherwise initiated by an input, attempts to configure the presentation system to work in concert with a slide show system such as GUI 100 to produce an output signal for display to the audience. Checkbox 414 functions as a logical switch within GUI to variously activate or deactivate the option through which a user's voice commands may be used to select the segment to be shown to the audience. Items on drop-down list 416 may be selected in order to customize the appearance of GUI 400 to the user. Checkbox 418 may be used to control how queries are evaluated against an index of the contents of the slides. Value field 420 may display speech score pertaining to voice recognition in the computing device. The presenter may specify the directory of a deck set using drop-down list 422. The directory of a deck set may be loaded for use within GUI 400 via button 423 or deleted from GUI 400 via button 424.

The term deck may have its standard meaning or may refer to a single media presentation such as a Powerpoint presentation or may refer to a group of presentations of one or more types. For example, a deck may be loaded of a group of Powerpoint presentations and a group of Microsoft Word documents and Wordperfect documents. In general, the deck is a group of searchable documents that are made available to the presenter during a presentation. A deck may be grouped onto on computing device or may be distributed among interconnected (wired or wireless) computing devices.

Thus, the modules of system 400A may be used to exit the GUI, configure an audience's video monitor, set the voice selection mode, customize the appearance of the GUI to the user, control how queries from the presenter are evaluated against an index of the contents of slides, indicate the speech score, specify deck sets, and load or delete deck sets to be used within the computing device. In this manner, the user can control the behavior, appearance, and other variable settings of the GUI. Those of ordinary skill in the art will understand the programming languages and means for generating the buttons, check boxes, drop-down lists, and value fields which may be contained in control view 400A.

The second-level view within the GUI is the loader view 400B, illustrated in FIG. 4B. Important controls on the loader view 400B include an "AVAILABLE DECKS" pane 426, an "ACTIVE DECKS" pane 430, an "ACTIVATE DECK" button 428, as well as a "DEACTIVATE DECKS" button 432, "GET DECKS FROM A DIFFERENT DIRECTORY" button 434, a "CREATE GRAMMAR" button 436, and a "START UP SLIDESHOW" button 438.

Pane 426 contains thumbnails showing the first slide of each available deck. Pane 430 contains thumbnails showing the first slide of each active deck. Available decks may be transferred from pane 426 into pane 430 either by dragging and dropping (as in: by means of a mouse pointer) or by use of button 428. Conversely, active decks may be deactivated by means of button 432. Button 434 allows the user to specify material in directories other than that listed in pane 426. Button 436 initiates the process addressed by FIG. 7 whereby active decks are indexed sufficiently to enable content-based queries. When clicked, or otherwise initiated, button 438 starts up the slideshow and causes the computing device to display the first slide to the audience and switching to presenter view 400C.

The available decks, when transmitted to the active deck group via button 238, causes the computing device to preprocess the available deck such that a grammar is created based on the content of the deck. Decks may be selected and preprocessed such that a database is created including a grammar that may be used as part of a spoken dialog interface to retrieve portions of each deck. In the example above, an available deck may include several slides that refer to Lexington and Concord. The preprocessing of these decks processes the content, which may include metadata information or presenter notes information, such that an active deck can be searchable via a voice input. Words associated with segments that may be processed and thus searched may include words or text that describes non-text content. Such as "image:dog" that describes a picture within a slide. This type of data may be automatically or manually added as part of the preprocessing or may be part of the software used to create the deck or presentation. For example, in software such as Powerpoint, the user may be asked to provide keywords describing an image in a slide. The keywords are then made available to the preprocessor for future searching and retrieval by a presenter. The slide or segment may also include audio clips, video clips, or other features that may be searched or made searchable.

Consider again the example above of the user making changes or generating an additional slide or slides while traveling to a presentation, and then desiring to access the recently changed slides on a portable computing device. In that case, the portable device may have software capable of preprocessing the slide(s) such that they are available for searching, at which point the portable device and the computing device used by the presenter for the presentation may communicate in advance of the presentation and "synchronize" in that the grammar on the presenter computing device is updated to include the changed slides to make those slides searchable. The slides may also be automatically transferred to the computing device or be accessible via a wired or wireless connected for searching. One benefit of this searching and interactive approach is that where slides are changed at the last minute, as often happens with presentations, they can easily become accessible during the presentation where the presenter can speak, retrieve, and present the updated slide. One way to do this can occur where the presenter puts in the presenter notes of the changed slide "MY UPDATED SLIDE" and during the presentation, the presenter may say "replace slide 12 with my updated slide". Since the updated slide is preprocessed and thus part of the deck, inserting or positioning the new slide during the presentation becomes an easy task.

Utilizing the controls available on view 400C, the user can specify which decks will be included in content-based queries which are executed during the course of a presentation, get decks from a different directory, create a grammar for use as an understanding model for the system, and start up the slide show. The loader view plays a significant role in defining the first plurality of segments discussed in system 300 step 302 (see FIG. 3). It is generally understood that the preprocessing of the available decks is performed in advance of a presentation. However, there may be instances where a presenter, dynamically while in a presentation, may select an available deck, process the deck, and make it available during the presentation. The architecture of the system supporting some of the functions available to the user via loader view 400C is further illustrated in FIG. 7.

The most significant functional aspect of the present invention is demonstrated in the presenter view 400C illustrated in FIG. 4C. Controls on the presenter view 400C may include a view of the "CURRENT SLIDE" 440, a preview of the "NEXT SLIDE" 442, a review of the "PREVIOUS SLIDE" 444, a "CLICK TO SPEAK" button 446, a "SPEECH FEEDBACK" window 448, a scrollable list of slides matching a query from the presenter 450, and a "GO BACK" button 452.

View 440 continuously displays whatever material is on display for the audience throughout the presentation. Preview 442 is a thumbnail image of the slide immediately succeeding the current slide. Review 444 is a thumbnail image of the slide immediately preceding the current slide. Button 446, when clicked, or otherwise initiated, indicates to system 400 that the presenter's vocalizations should be interpreted as commands for use in controlling the system. Other speech initiation controls may exist as well, such as a particular trigger word such as "computer, search for". Window 448 displays to the presenter text generated by the computing device to show explicitly the manner in which the system has interpreted an input, preferably in the form of speech, from the presenter. List 450 displays thumbnail images of segments which the system most closely associates with the text it has received via an input from the presenter. In the event that the presenter desires to return to previous material, he or she can do so using button 452.

Figure 6:
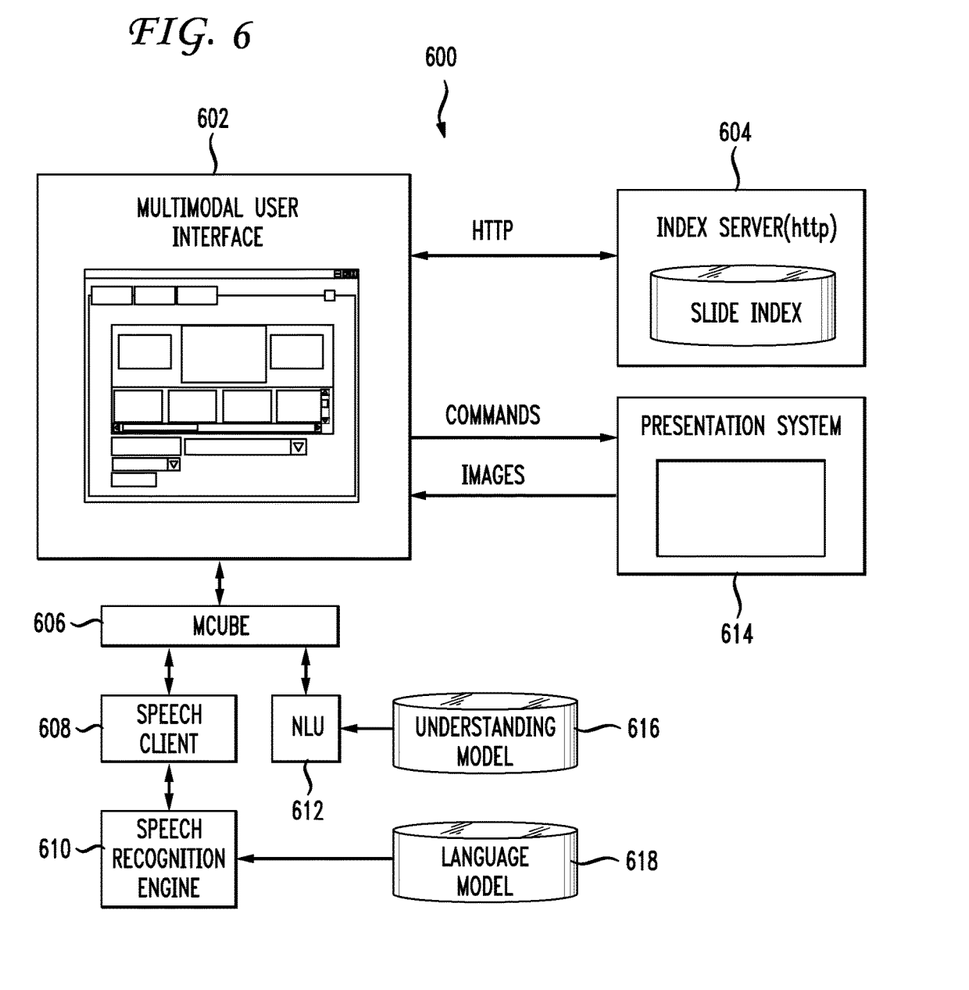
FIG. 6 illustrates the architecture of the underlying system.

Thus, the presenter view 400C provides simple controls allowing the presenter to view the current slide being displayed, preview the next slide in a prepared sequence, review the previous slide in a prepared sequence, indicate to the system that his or her speech should be interpreted as commands for the multimodal presentation control system, verify the accuracy of the system's voice recognition module in the form of text, view a second group of media segments retrieved by the system in response to the presenter inquiry and go back to the previous system state as needed. The architecture of the system supporting the functions available to the user via loader view 400C is illustrated in FIG. 6.

Again, as an example, if the presenter clicks the click to speak button 446 and says, "let's go back to the slide about Lexington and Concord", the system will return and present the group of slides in response to the inquiry in row 450. They may be numbered or presented in some other fashion such that the presenter can easily narrow down which slide or slides to show next to the audience.

The main operation of the system that is relevant for this patent submission occurs in the presenter view 400C (see also FIG. 3). Once a user has selected presentations using the loader view 400B, he or she may switch to the presenter view 400C in order to commence with the presentation. The system supports two kinds of commands: basic commands and content-based commands. Basic commands may be used for navigating among slides such advancing to the next slide, going back to the previous slide, jumping to the first or last slide, jumping to a slide by number, and going back. All of these basic commands can be given in speech. For example, "next slide please," "please show the previous slide," "please show slide five," "go back." All basic commands apply in like manner to any presentation, and without regard to the content of a presentation. Content-based commands in contrast, allow the user to navigate to slides based on alphanumeric text, words, themes and phrases that appear in the slides, metadata, presenter notes and so forth. The following are examples of content-based commands: "please show slides about internet security," "can you find me the slide on pension planning?" "do you have a slide about multimodal interfaces?" These content-based commands and the interface around them are the central part of the invention described herein.

Further in presenter view in FIG. 4C, a pull-down menu 447 associated with a list of key phrases is included. This enables the user to easily access some basic or commonly used phrases within the content. This and other pull-down menus may be utilized to improve the speech recognition. For example, this pull-down menu 447 may be pre-populated with phrases that summarize the content of segments, such as "Lexington/Concord" and "Bunker Hill". The user may then be able to navigate to specific content using this pull down menu instead of the speech interface. The source for the data for the pull-down menu 447 is the preprocessed decks and the content analysis performed.

Figure 5:
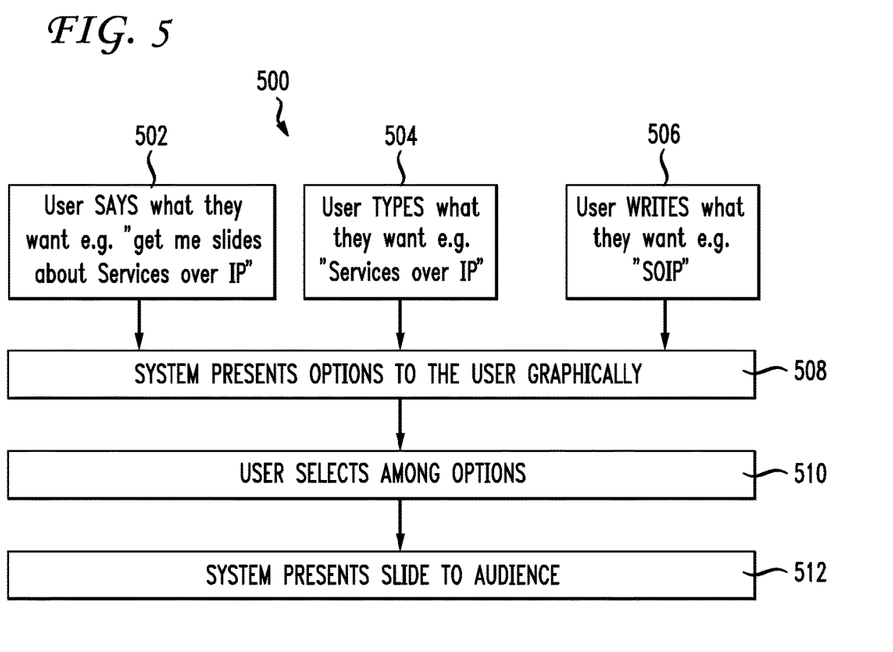
FIG. 5 illustrates the interactions of the human user and the system.

The diagram in FIG. 5 shows the interaction flow method 500 when a user gives a content-based request during a presentation. In step 502, the user says what he or she wants. In step 504, the user types what he or she wants. In step 506, the user uses graffiti to write what he or she wants. In step 508, the system presents options to the use graphically. In step 510, the user selects among the options from step 508. Finally, in step 512, the system presents the segment selected in step 510 to the audience.

In the first step the user can issue the content-based query, either by speech 502, typing 504, or writing relevant words using a pen 506. The inclusion of these three specific means of input is not intended to preclude the use of other means of input capable of conveying meaningful content to the system. In the second step 508, the system makes use of the graphical display (section 450 of the presenter view 400C illustrated in FIG. 4C) to present options to the user from which to make a selection. The advantage of this for the presenter is that he or she can view the possibilities during a presentation without showing this selection process to the audience. The next step 510 is for the presenter using voice, gesture, pen, via touch-screen, or by other means to select the desired slide from the group of slides presented in step 508. In the final step 512 of method 500, the selected slide is then displayed on the audience view.

The system illustrated in FIG. 6 is the underlying architecture of the multimodal system for content-based control 600. FIG. 6 shows the components of the system. The user interacts with a multimodal GUI 602. Variations on this GUI are illustrated in FIGS. 4A, 4B, and 4C. Interface 602 communicates using HTTP or some other protocol with an index server 604 which in response to a content-based command returns a list of the slides which are relevant. This step can also be achieved using Xpath queries over an XML version of the slide presentation, without an HTTP connection or index server. The interface 602 is connected over TCP/IP sockets to a facilitator agent MCUBE 606 which enables system components to communicate with each other. Also connected to MCUBE 606 there is a speech client 608 which collects speech from the user when indicated by the user (please see FIG. 4C, button 446) and communicates with the speech recognition engine 610 (such as AT&T's Watson™) in order to provide a transcription of the command given by the user. The Natural Language Understanding component (NLU) 612 converts the recognized speech into a semantic representation in XML, which the multimodal UI 602 can execute. The NLU is currently achieved using a finite-state transducer such as are known to those of skill in the art. Application Ser. No. 09/904,253, filed Jul. 12, 2001 and Ser. No. 10/278,921 filed Oct. 24, 2002 and U.S. Pat. No. 6,868,383 represent information related to this technology that is incorporated herein by reference. This step could also be achieved with other kinds of grammar-based or trained understanding systems. The multimodal user interface 602 also communicates with the presentation software (see FIG. 1). This is used in order to access content on the slides, get graphical thumbnails of slides, and change what is shown to the audience. Display 614 represents the audience view of the presentation. It is understood that any type of spoken dialog modules for speech recognition, language understanding, and so forth may be utilized. There is no specific speech technology that is essential to the practice of the invention.

Figure 7:
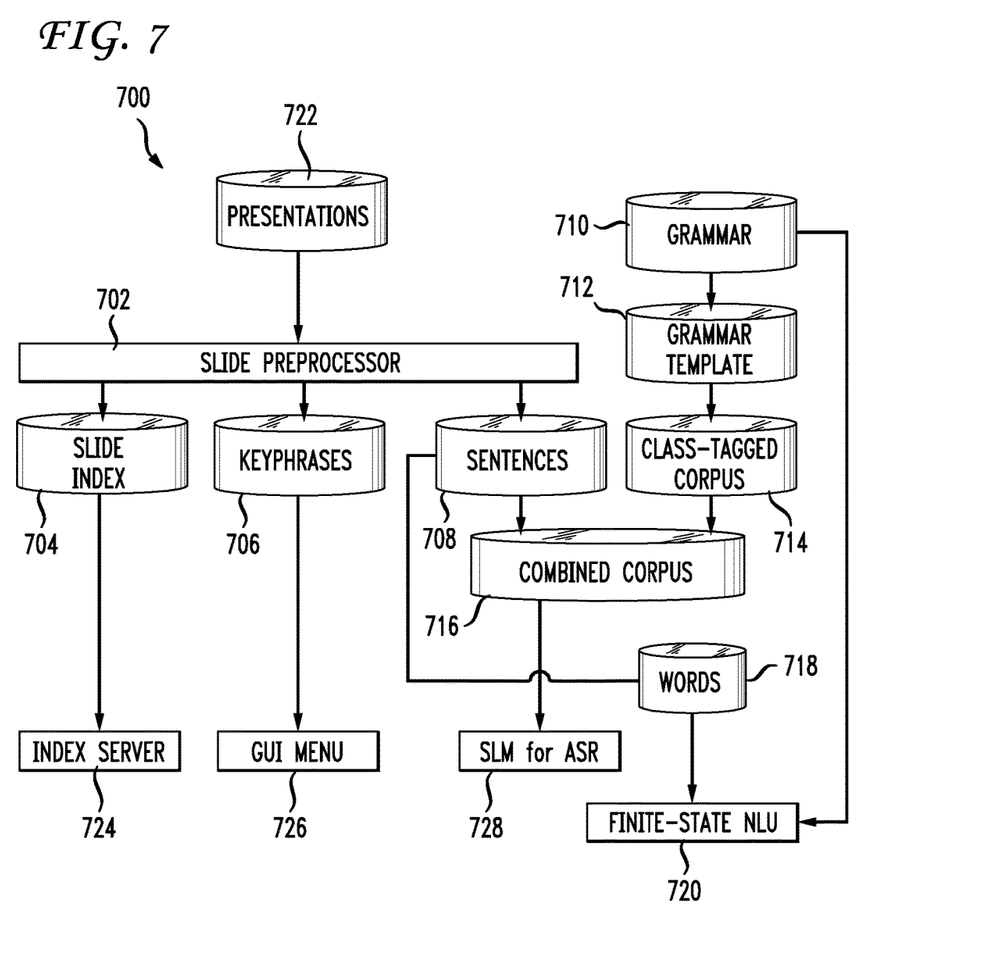
FIG. 7 illustrates the presentation processing architecture.

FIG. 7 provides an illustration of system 700 that outlines the processing that takes place in order to build a language model, understanding model, and index for a selected set of presentations. This processing takes place when indicated by the user (see FIG. 4B, button 436) or may be automated to process decks to make them available controlling. The set of presentations are processed by a slide preprocessor 702 which extracts the content from the slides and generates three outputs. The first of these is an XML or web form of the set of slides 704 which is indexed by the index server and used for information retrieval. The second is a list of key phrases 706 that are used to populate a GUI menu in the presenter view, which allows quick input of queries by selection from a pop-up menu. The third is a corpus of all the sentences that appear on all of the slides 708. A finite-state grammar 710 describes how to assign XML semantic representation to sentences spoken by the user. A grammar template 712 is built from finite-state grammar 710 and used to create a class-tagged corpus of sentences 714. The class tag in this corpus is used to abstract over specific content in content-based queries. The set of sentences extracted from the slides 708 is substituted into place of the content class tag in 714. The resulting corpus 716 is used to build a stochastic language model for use in speech recognition. The words contained in the list of sentences 718 are extracted and used to extend the grammar so that it can be used as an understanding model for the system (NLU) 720.

According to system 700, the content of slides within a presentation or presentations is used to create an index, a list of key phrases, and a grammar. These elements, when used in combination, allow the slides in presentation to be searched and retrieved on the basis of their contents.

There is a need for the ability to navigate rapidly and easily to the content required to support a presentation without having to interrupt the organized flow of information to an audience. A system has been created consisting of a multimodal graphical user interface capable of content-based information retrieval for the control of a presentation system.

Embodiments within the scope of the present invention may include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practices in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, while Microsoft's Powerpoint application has been mentioned, the invention is not limited to "slideshows" but is applicable to any presentation where content needs to be accessible and searchable. For example, movies may be preprocessed in this way where the subtitle information is processed and a grammar created that associates the content or portion of the text with a scene such that the user can say "please take me to the scene where Darth Vader says 'I am your father'". In this regard, Ser. No. 11/213,457 is incorporated herein by reference. Applying the video context to the present invention, assume a "deck" comprises both a Powerpoint presentation and a preprocessed movie such as Star Wars episode IV. The presenter could be in the middle of the slideshow and access segments from the movie by saying "present the scene where Darth Vader says 'I am your father'". One or more indexed segments of the video presentation may be shown on the presenter display for selection and presentation to the audience. In this manner, it can be seen that any type of segmented multimedia presentation may be preprocessed and included or accessible as a deck. Different types of presentations may also be accessible to enhance the power of the presenter's presentation. Accordingly, the appended claims and their legal equivalents should only define the invention, rather than any specific examples given.

We claim:

1. A method comprising:

processing, prior to presentation of a media presentation, the media presentation to enable content searchability as part of a speech dialog between a presenter and a computing device and to generate a grammar associated with the media presentation;

receiving from the presenter during presentation of the media presentation, at the computing device having a first display, a spoken request which characterizes content within a plurality of segments from the media presentation;

while simultaneously displaying the media presentation to an audience on a second display that is physically separate from the first display, displaying, based on accessing the grammar, to the presenter on the first display, and not to the audience on the second display, graphical views of the plurality of segments from the media presentation in response to the spoken request;

receiving a selection of one of the graphical views, to yield a selected segment from the plurality of segments; and based on the selection, displaying to the audience the selected segment on the second display.

2. The method of claim 1, wherein the second display is not capable of receiving audience interaction input.

3. The method of claim 1, wherein the grammar is used to analyze the spoken request prior to the displaying of the graphical views to the presenter.

4. The method of claim 1, wherein the spoken request is coupled with a distinct modality request, wherein the distinct modality request is one of a written request, a gesture, a mouse-click, and a typed command.

5. The method of claim 4, wherein, the spoken request is made distinguishable from other vocalizations of the presenter by means of a speech control initiation.

6. The method of claim 1, wherein the plurality of segments is processed in order to accommodate content-based retrieval of a second plurality of segments using a grammar.

7. A system comprising:

a processor; and a computer-readable storage medium having instructions stored which, when executed by the processor, result in the processor performing operations comprising:

processing, prior to presentation of a media presentation, the media presentation to enable content searchability as part of a speech dialog between a presenter and a computing device and to generate a grammar associated with the media presentation;

receiving from the presenter during presentation of the media presentation, at the computing device having a first display, a spoken request which characterizes content within a plurality of segments from the media presentation;

while simultaneously displaying the media presentation to an audience on a second display that is physically separate from the first display, displaying, based on accessing the grammar, to the presenter on the first display, and not to the audience on the second display, graphical views of the plurality of segments from the media presentation in response to the spoken request;

receiving a selection of one of the graphical views, to yield a selected segment from the plurality of segments; and based on the selection, displaying to the audience the selected segment on the second display.

8. The system of claim 7, wherein the second display is not capable of receiving audience interaction input.

9. The system of claim 7, wherein the grammar is used to analyze the spoken request prior to the displaying of the graphical views to the presenter.

10. The system of claim 7, wherein the spoken request is coupled with a distinct modality request, wherein the distinct modality request is one of a written request, a gesture, a mouse-click, and a typed command.

11. The system of claim 10, wherein, the spoken request is made distinguishable from other vocalizations of the presenter by means of a speech control initiation.

12. The system of claim 7, wherein the plurality of segments is processed in order to accommodate content-based retrieval of a second plurality of segments using a grammar.

13. A computer-readable storage device having instructions stored which, when executed by a computing device, result in the computing device performing operations comprising:

processing, prior to presentation of a media presentation, the media presentation to enable content searchability as part of a speech dialog between a presenter and a computing device and to generate a grammar associated with the media presentation;

receiving from the presenter during presentation of the media presentation, at the computing device having a first display, a spoken request which characterizes content within a plurality of segments from the media presentation;

while simultaneously displaying the media presentation to an audience on a second display that is physically separate from the first display, displaying, based on accessing the grammar, to the presenter on the first display, and not to the audience on the second display, graphical views of the plurality of segments from the media presentation in response to the spoken request;

receiving a selection of one of the graphical views, to yield a selected segment from the plurality of segments; and based on the selection, displaying to the audience the selected segment on the second display.

14. The computer-readable storage device of claim 13, wherein the second display is not capable of receiving audience interaction input.

15. The computer-readable storage device of claim 13, wherein the processing of the media presentation generates a grammar used to analyze the spoken request prior to the displaying of the graphical views to the presenter.

16. The computer-readable storage device of claim 13, wherein the spoken request is coupled with a distinct modality request, wherein the distinct modality request is one of a written request, a gesture, a mouse-click, and a typed command.

17. The computer-readable storage device of claim 16, wherein, the spoken request is made distinguishable from other vocalizations of the presenter by means of a speech control initiation.

* * * * *